INVENTOR.
JACK E. PELLETIER, JR.
BY Gardner + Zimmerman
ATTORNEYS

United States Patent Office 3,368,749
Patented Feb. 13, 1968

3,368,749
NAVIGATIONAL PLOTTING CHART
Jack E. Pelletier, Jr., 364 1st St.,
Oakland, Calif. 94601
Continuation of application Ser. No. 387,462, Aug. 4, 1964. This application Feb. 16, 1966, Ser. No. 534,587
2 Claims. (Cl. 235—78)

The present invention relates generally to navigational aids for assisting a pilot in the performance of various functions required in the flying of an airplane, and is particularly directed to a navigational plotting chart for enabling a pilot to ascertain at a glance his position relative to various courses or headings to be followed in landing and the like, as well as the direction of the wind in relation to these courses. This application is a continuation of my copending application, Ser. No. 387,462 filed Aug. 4, 1964, for a Navigational Plotting Chart, now abandoned.

In connection with the flying of an airplane, it is necessary for a pilot to be constantly aware of his course and the wind direction relative to other courses or headings which he may be subsequently required to follow. This is particularly the case in the landing of an airplane where the landing instructions frequently require a 180 degree approach to a runway having a given geographical orientation. For example, the landing instructions from an airport control tower may be for a 180 degree approach to runway 31 and the windage may be reported to be from a direction of 268 degrees at a velocity of 16 miles per hour. In carrying out these instructions it is necessary to fly a reciprocal course or heading parallel to the runway, followed by two 90 degree turns into a straight-in approach to the runway. In other words it is necessary to pursue a heading of 211 degrees, followed, for example, by successive headings of 301 degrees and 31 degrees. At the same time it is necessary to appropriately compensate for the windage as each heading is followed. While following heading 211 degrees, the wind is from a direction of 57 degrees to the right of the nose of the plane, and it is therefore necessary to employ a suitable amount of right rudder to compensate for the windage. Upon turning to the heading of 301 degrees, the wind is from a direction of 33 degrees to the left of the nose of the plane, and left rudder is employed for windage compensation. Similarly, while pursuing the direct approach heading of 31 degrees the wind is from a direction of 123 degrees to the left of the nose of the plane, and compensation is obtained with an appropriate amount of right rudder.

From the foregoing example it will be appreciated that a pilot must at all times be aware of the position or general bearing of the plane with respect to various other headings and the direction of the wind. Such relative bearings of the plane are usually ascertained by mental calculations of the pilot. Although these calculations are mathematically simple, some amount of concentration is still required which detracts from the ability of the pilot to devote his full attention to the numerous operations involved in the piloting of the plane, particularly during landing or take-off. When the pilot must maintain a mental picture of the plane's bearing, windage, and subsequent headings, and at the same time make appropriate flap, rudder, and throttle adjustments, retract or extend the landing gear, etc., confusion is likely to result either as to the headings to be followed or as to the proper conduct of the flying operations. The results of such confusion may be disastrous inasmuch as a wrong heading may be followed in the crowded control area of an airport which might result in a collision with another craft. The pilot may forget to extend the landing gear, become confused as to the direction of the wind relative to the plane and improperly compensate therefor, or otherwise improperly and disastrously pilot the craft. This is particularly the case with beginners.

It is therefore an object of the invention to provide a navigational plotting chart for providing a visual indication to a pilot of the position of his plane relative to azimuth headings and wind direction whereby the pilot can ascertain at a glance various headings to be followed and the orientation of the plane with respect to wind direction during pursual of these headings.

Another object of the invention is the provision of a chart of the class described which is readily adjustable and upon being set for a predetermined heading and wind direction visually indicates the reciprocal heading and 90 degree base leg headings to be pursued in flying a 180 degree approach pattern while at the same time indicating the wind direction relative to the plane during all phases of the pattern.

It is a further object of the invention to provide a navigational plotting chart of the class described which is light weight, durable, and of pocket size such that it may be easily carried by a pilot and be convenient at all times.

A still further object of the invention is to provide a navigational plotting chart of the character outlined above which is simple and economical in construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Figure 1:
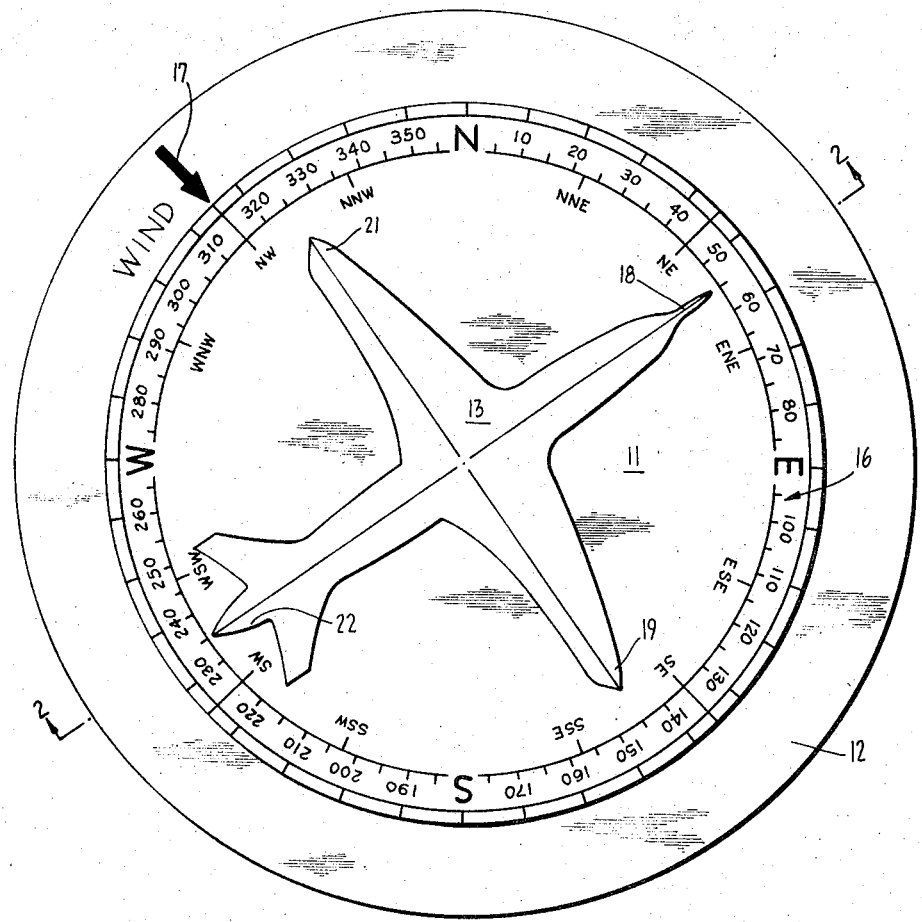
FIGURE 1 is a top plan view of the navigational plotting chart of the present invention.
Figure 2:
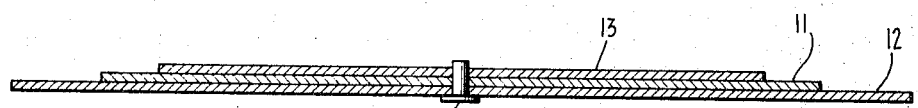
FIGURE 2 is a sectional view taken at line 2—2 of FIGURE 1.

Referring now to the drawing, the navigational plotting chart of the present invention will be seen to include upper and lower discs 11, 12 and an aircraft indicator 13 disposed in stacked relation and secured for concentric rotation relative to one another as by means of a rivet 14 extending coaxially therethrough. The upper disc 11 serves as an azimuth indicator dial, and in this regard is provided along its marginal edge with azimuthal graduations as generally indicated at 16. This azimuth scale, in addition to being graduated in degrees from 0 degree to 360 degrees, is preferably provided with the letters N, S, E, W at the 0 degree or 360 degree, 180 degree, 90 degree, 270 degree graduations of the scale to indicate the north, south, east, west geographical directions, as illustrated in FIGURE 1. Secondary geographical directions such as north-east, north of north-east, and east of north-east may also be designated on the azimuth scale respectively by the groups of letters NE, NNE, and ENE, as shown.

The lower disc 12 is of a greater diameter than the upper disc 11 so that its periphery is visible when viewed from above disc 11. On the visible portion of disc 12 there is inscribed, or otherwise provided, a wind direction arrow 17, or equivalent indicator mark. Thus, the upper and lower discs may be rotated relative to each other to position the arrow 17 opposite any desired graduation of the azimuth scale. There is thus provided a visual indication of the azimuthal direction of the wind.

The aircraft indicator 13 serves to simulate an airplane and may be pointed to any desired heading of the azimuth scale 16 by rotation of the indicator with respect to the disc 11. Consequently, with the indicator directed towards a given heading pursued by an airplane and the windage arrow 17 set opposite the azimuthal direction of the wind, this windage information being obtainable over the communications system of the plane, a visual indication of the orientation of the plane with respect to the wind direction is immediately provided. With this visual indication, the pilot can devote complete concentration to the measures required to compensate for the windage without at the same time attempting to maintain and rely upon a mental picture of the plane orientation relative to the wind direction. This is particularly beneficial when it is necessary to change course frequently. The indicator 13 is merely rotated to point to each new heading on the azimuth scale, whereupon the orientation of the plane with respect to the wind is immediately ascertainable.

Aside from the foregoing use of the navigational plotting chart in providing a visual indication of plane orientation with respect to wind direction, the chart is useful for various other navigational purposes. In this regard the aircraft direction indicator 13 is best provided with four radially projecting pointer arms respectively at 90 degree angular intervals. As depicted in the drawing, these pointer arms extend outward to positions closely adjacent azimuthal scale 16 to facilitate their use as pointers and assure that a correct reading is obtained. More particularly the indicator 13 preferably has the plan view configuration of an airplane, the nose 18, opposite wing tips 19, 21, and tail 22 being the four pointer arms. Thus, the nose 18 is the primary pointer and may be directed towards any given heading on the azimuth scale 16. The tail 22 then immediately provides a visual indication of the reciprocal course or heading while the wing tips 19, 21 indicate courses at 90 degrees to the heading. This information is required in flying a 180 degree approach pattern, as will be subsequently described in detail.

The discs 11, 12 and aircraft direction indicator 13 are preferably fabricated from sheet metal, such as sheet aluminum, so as to provide a durable light weight device. Moreover, the chart may be made quite compact so as to be readily carried in the pocket. Thus the chart may be easily carried by a pilot so as to be conveniently available at all times.

Considering now the use of the chart under several specific circumstances, first assume that a pilot desires to fly a heading of 55 degrees. Thus aircraft direction indicator 13 is set with the nose 18 opposite the 55 degree graduation of the azimuth scale 16 of the disc 11. In addition, assume that the windage information received from the airport control tower specifies that the wind direction is 315 degrees. Thus, disc 12 is rotated to position windage arrow 17 opposite the 315 degree graduation of the azimuth scale. The chart is thus set up as illustrated in FIGURE 1. The chart hence visually indicates to the pilot that in flying the 55 degree heading he will experience a cross wind substantially directly from the left of the craft. Such a cross wind has a tendency to blow the plane over and the pilot will accordingly take measures to keep the left wing down when flying the 55 degree heading to avoid this from happening.

Now assume that the 55 degree heading is that of an airport runway at which it is desired to land and that the landing instructions call for a 180 degree approach. Thus it is necessary to fly a reciprocal heading followed by two 90 degree turns and a direct approach to the runway. The pilot would normally have to compute the required headings in flying this 180 degree approach pattern in his head at a time his mind is occupied with the many manipulations and observations required in landing the craft. However, with the navigational chart of the present invention the required headings are directly indicated. More particularly, the tail 22 indicates the required reciprocal heading of 235 degrees, while the wings 19, 21 indicate headings of 145 degrees and 235 degrees, either of which is followed in executing the first 90 degree turn of the pattern. As to which of the headings are followed in executing the turn depends, of course, upon which side of the runway the craft is positioned in pursuing the reciprocal heading. Following the 90 degree turn, the direct approach heading of 55 degrees is followed. In all headings followed in executing the reciprocal approach pattern, the windage relative to the orientation of the plane is directly ascertainable from the windage arrow 17.

What is claimed is:

1. A navigational plotting chart for visually indicating the position of an aircraft relative to azimuthal headings and wind direction comprising first and second discs mounted for concentric rotation relative to each other, said first disc having a graduated azimuth scale on its exposed face adjacent the marginal edge thereof, said second disc having a wind direction indicating mark means on its exposed face for selective alignment with the graduations of said azimuth scale and operable to provide an azimuthal direction indication of the wind, an aircraft direction indicator means mounted for concentric rotation relative to said first and second discs for selective alignment with the graduation of said azimuth scale on said first disc and operable to provide an azimuth heading of an aircraft and thereby provide the azimuthal relationship of the aircraft heading and wind direction, said aircraft direction indicator means having the configuration of an aircraft with the nose, wings, and tail thereof terminating in pointed ends extending closely adjacent to said azimuthal scale at 90° intervals to form four pointer arm means operable to provide a direct indication of aircraft heading in a 180° approach pattern and the azimuthal relationship of the wind direction thereto, means securing said indicator means and first and second discs in stacked concentric rotatable relation to each other in that order, and said wind direction indicating mark means on said second disc being a radially inwardly directed windage arrow inscribed on said exposed face adjacent the marginal edge thereof.

2. A navigational plotting chart according to claim 1 further defined by said first and second discs and said direction indicator means being formed of light weight metal, and by said means securing said discs and indicator means being a rivet extending coaxially therethrough.

References Cited

UNITED STATES PATENTS

| | | | |
|---|---|---|---|
| 2,239,959 | 4/1941 | Gray | 235—83 |
| 2,481,846 | 9/1949 | King | 235—83 |
| 2,916,825 | 12/1959 | Parsons | 235—61 XR |
| 2,996,242 | 8/1961 | Bannister | 235—88 XR |
| 2,999,635 | 9/1961 | Robertson. | |
| 3,043,503 | 7/1962 | Kritser | 235—78 XR |
| 3,100,601 | 8/1963 | Shapiro | 235—78 XR |
| 3,152,756 | 10/1964 | Meyerson | 235—88 |

STEPHEN J. TOMSKY, *Primary Examiner.*